Sept. 25, 1956   R. M. WARD ET AL   2,764,458
PISTON RING
Filed Oct. 12, 1953   2 Sheets-Sheet 2
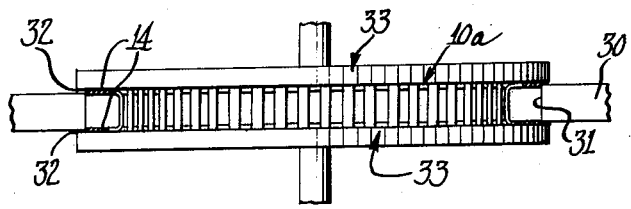
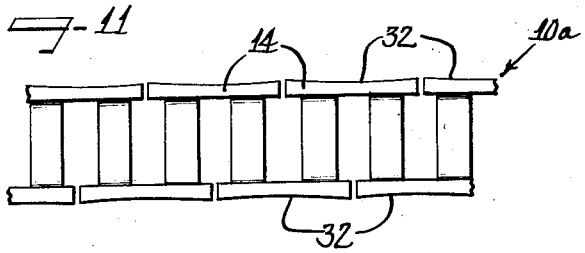
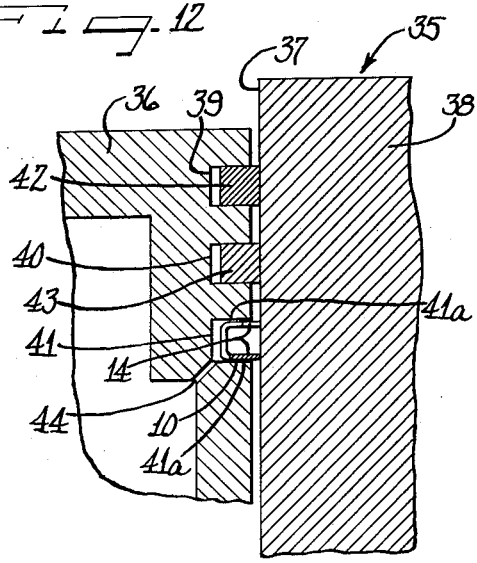
Inventors
ROBERT M. WARD
IVAN R. KACIR

United States Patent Office 2,764,458
Patented Sept. 25, 1956

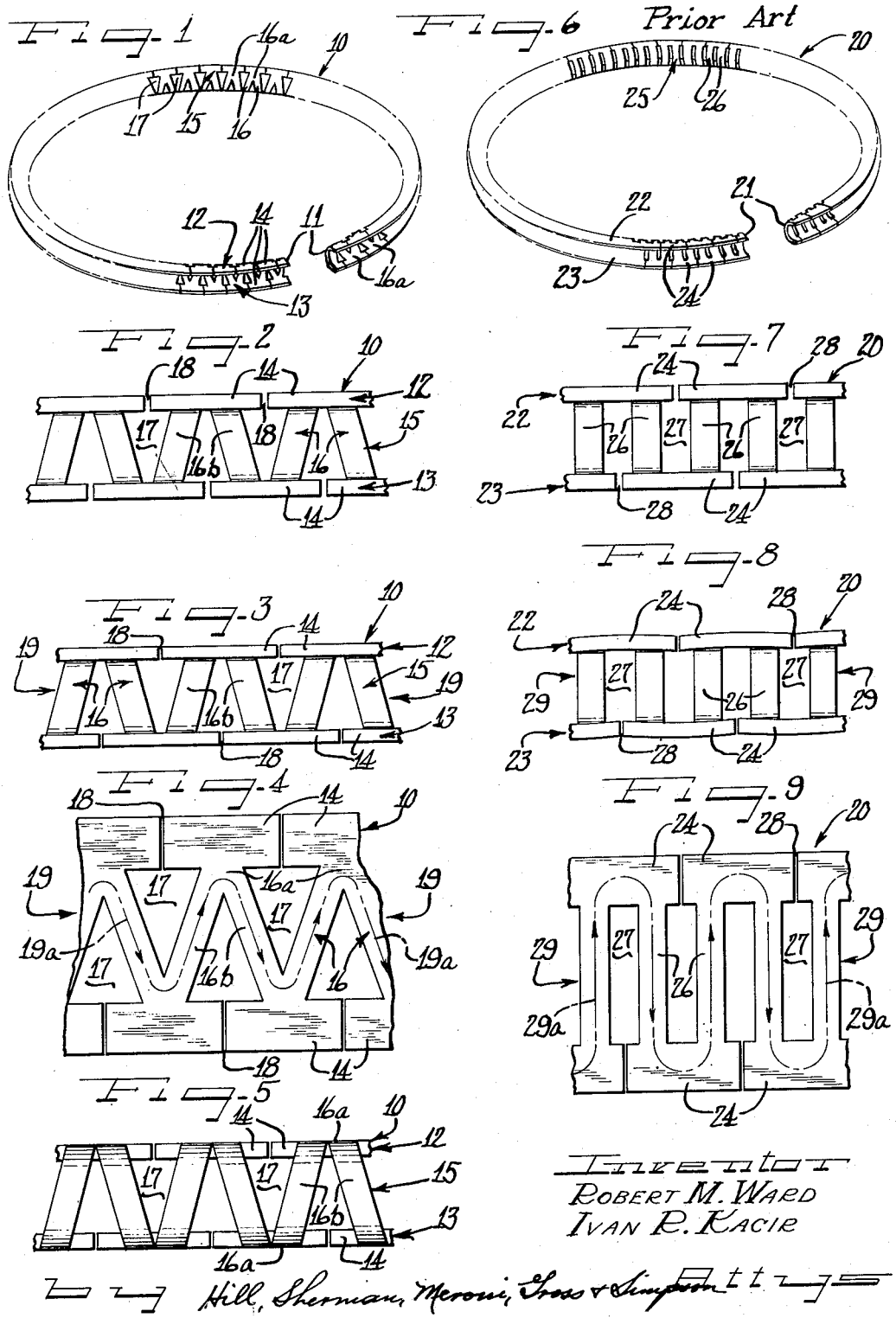

2,764,458

PISTON RING

Robert M. Ward, Cleveland Heights, and Ivan R. Kacir, Euclid, Ohio, assignors to Thompson Products, Inc., Cleveland, Ohio, a corporation of Ohio Application October 12, 1953, Serial No. 385,440

13 Claims. (Cl. 309—44)

This invention relates to circumferentially expansible and contractible piston rings having enhanced oil sealing capacity. Specifically, this invention relates to sheet metal type oil rings for internal combustion engine pistons which will not "hump" when circumferentially compressed to operating diameters.

Resiliently contractible and expansible sheet metal oil rings for pistons composed of axially spaced rows of circumferentially arranged segments or lands connected by webs holding the rows in axially spaced relation and holding the segments in alignment in the rows are known in the prior art as for example, in the Thomas A. Bowers Patent No. 2,224,338, dated December 10, 1940. These prior art sheet metal oil rings for pistons, however, tend to "hump" when circumferentially compressed. This "humping" prevents proper sealing of the sides of the ring with the sides of the ring groove and leakage of oil results.

The present invention now provides a resiliently contractible and expansible sheet metal piston ring which will maintain efficient sealing cooperation with the sides of the ring groove when compressed to the operating diameter. The rings of this invention can have longer segments than were heretofore usable in the axially spaced rows and these segments are so arranged as to have flat sealing contact throughout their length with the sides of the ring groove. Heretofore, the maximum ring segment lengths have been on the order of 0.2". According to the present invention this maximum can be increased if desired, to 0.4" in length and may be as long as 0.6" in length. The rings of this invention can be tin-coated, compressed to their operating diameter and lapped or ground on their side faces, to a flat finish. The thus lapped rings will have concave segments in their uncompressed state but the concavity will disappear when the rings are compressed to their operating diameter in use.

A further feature of this invention resides in the provision of connecting webs for the ring segments which diverge from the central portions of the segments. These webs are thus arranged in V-shaped pairs with the legs of one pair diverging from the central portion of a segment in one row to the central portion of adjacent segments in the other row. When the divergent ends of the webs are moved toward each other during radial compression of the ring, the segments will not be "humped" but will remain in their flat shape because the compressive forces do not create any bending movements in the segments.

It is then an object of this invention to provide a resiliently contractible and expansible piston ring of sheet metal which will not "hump" when radially compressed to its operating diameter.

Another object of this invention is to provide a sheet metal oil ring for pistons having increased oil economy due to the presentation of the flat side faces on the ring to the flat side faces of the ring groove.

A still further object of this invention is to provide a sheet metal piston ring composed of axially spaced rows of circumferentially spaced segments with the segments of each row being unrestricted in length up to about 0.6".

A further object of this invention is to provide a sheet metal piston ring of the type disclosed in the Thomas A. Bowers Patent No. 2,224,338, which will not "hump" out of sealing contact with the sides of the ring groove when compressed to operating diameter.

A still further object of this invention is to provide V-shaped webs for connecting the segments in a segmented resilient compressible sheet metal piston ring of U-shaped cross-section.

A further object of this invention is to provide an oil sealing ring for pistons having flat side faces when compressed to operating diameter wherein the side faces are composed of circumferentially arranged segments.

Other and further objects of this invention will be apparent to those skilled in the art from the following detailed descriptions of the annexed sheets of drawings which illustrate the principles of this invention.

On the drawings:

Figure 1 is a perspective view of the piston ring according to this invention.

Figure 2 is a fragmentary outside elevational view of the ring of Figure 1 in its uncompressed state.

Figure 3 is a view similar to Figure 2 but illustrating the radially compressed condition of the ring.

Figure 4 is a somewhat diagrammatic view illustrating the stresses through the webs of the ring of Figures 1 to 3 when the ring is radially compressed.

Figure 5 is a fragmentary inside elevational view of the ring of Figures 1 to 3.

Figure 6 is a perspective view of a prior art ring such as is disclosed in the Thomas A. Bowers Patent No. 2,224,338.

Figure 7 is a fragmentary outside elevational view of the ring of Figure 6 in its uncompressed state.

Figure 8 is a view similar to Figure 7 but showing the radially compressed condition of the ring of Figure 7.

Figure 9 is a diagrammatic view similar to Figure 4 but illustrating the force distribution through the webs and segments of Figures 6 to 8.

Figure 10 is a view illustrating the lapping or grinding of the side faces of the compressed ring in accordance with this invention.

Figure 11 is a fragmentary outside elevational view showing the concavity of the segments of a lapped or ground ring of this invention after the ring has been released to its free expanded condition.

Figure 12 is a fragmentary vertical cross-sectional view of a piston and cylinder assembly illustrating the manner in which the ring of this invention maintains efficient sealing contact with the sides of the piston ring groove.

Figure 13 is a greatly enlarged transverse cross-sectional view of a ring of this invention illustrating the manner in which the coating thereon is maintained for quick wear-in with the sides of the ring groove as well as with the engine cylinder.

As the shown on the drawings:

The ring 10 of Figures 1 to 3 is a sheet metal strip folded longitudinally upon itself to produce a channel of substantially U-shaped cross-section. This channel has opposed ends 11 which, in operation, are in abutting relation to provide a complete annulus. The ring, with the ends 11 in abutting relation, is resiliently compressible or radially contractible to exert external expanding force around its entire periphery and thereby maintain an efficient seal with the cylinder wall.

The ring 10 is composed of axially spaced rows 12 and 13 of circumferentially arranged flat segments, lands or crowns 14. These segments 14 are connected by a bight portion 15 composed of V-shaped webs 16. The webs 16 have base portions 16a at the longitudinal central portions of the inner peripheral edges of the segments 14 and extend peripherally inward to upstanding diverging leg portions 16b. The divergent ends of the leg portions 16b then merge into the bases 16a on the longitudinal central portions of the segments 14 in the adjacent row. Triangular-shaped openings 17 are thereby provided around the inner periphery of the ring and these openings extend into the rows 12 and 13 since the webs 16 are bent into U-shape to form the bight 15.

The segments 14 have radial slots 18 therebetween and the slots in the rows 12 and 13 are in staggered relation since the webs 16 diverge from the central portion of a segment 14 in one row to the central portions of the adjacent segments in the opposite row. This staggered arrangement of the slots 18 prevents leakage of oil axially through the ring.

The segments 14 project circumferentially beyond the bases 16a of the V-shaped webs 16 and thus have free unsupported end portions defining the slots therebetween. It is desirable to maintain these segments 14 in a flat condition so that the rows 12 and 13 will seal on the sides of the ring groove. It is also important to have the slots 18 in the rows 12 and 13 offset from each other a considerable distance to enhance the sealing capacity of the ring. The construction of this invention not only maintains the flat condition of the segments 14 when the ring is radially or circumferentially compressed, but also makes possible an increase in the length of the segments so that the slots 18 can be offset as much as desired.

As illustrated in Figures 2 and 3, the slots 18 are relatively wide or open when the ring is in its free expanded state. However, when the ring is circumferentially or radially loaded to impose forces such as are shown by the arrows 19 in Figure 3, the slots 18 will be narrowed without, however, bending or misaligning the segments 14.

As illustrated in Figure 4, compressive loading of the ring 10 such as occurs when the ring is resiliently contracted to its operating diameter, will not produce any bending moments in the segments 14. As shown by the arrows 19a, the stresses created by compression in the direction of the arrows 19 will be distributed entirely within the V-shaped webs 16 and will not in any way influence the segments 14. The compression of the ring thus swings the divergent ends of the legs 16b toward each other thereby creating a bending moment in the bases 16a. This bending moment, however, is preferably inward from the segments 14 and is at the central portion of the longitudinal extent of the segments. The segments, therefore, will remain in a flat condition.

In contrast, as illustrated in Figures 6 to 9, the prior art piston ring 20 will hump when its ends 21 are abutted together and the ring is radially compressed. This ring 20, like the ring 10, has axially spaced rows 22 and 23 of ring segments 24 connected by a bight portion 25 around the inner periphery of the ring. The bight portion 25, however, is composed of vertical webs 26 which are arranged in pairs adjacent the longitudinal ends of the segments 24 as shown in Figure 7 so that a pair of webs 26 extending from the end portions of a segment 24 in the row 22 will be connected to the end portions of the adjacent segments 24 in the row 23. Rectangular openings 27 are thereby provided between the webs 26 around the inner periphery of the ring.

Slots 28 are provided between the segments 24 in each row and these slots are staggered or offset in the rows 22 and 23.

As shown in Figures 7 and 8, the slots 28 are narrowed or diminished in width when the ring 20 is circumferentially or radially loaded to exert force in the direction of the arrows 29 in Figure 8. However, this compressive loading to decrease the width of the slots causes a bending of the segments 24 thereby producing a humping effect of the ring. The bending is effected by the fact that the webs 26 in moving to accommodate the contraction of the ring, must pull the ends of the segments inwardly. In Figure 9, the arrows 29a designate force distribution through the ring 20 when the ring is compressed. As shown by these arrows, bending moments are created in the segments 24 at the juncture between these segments and the webs 26. These bending moments will produce a humping as shown in Figure 8.

If the segments 24 are increased in length so that the webs 26 are spaced further apart, the humping is accentuated since the swinging of the webs 26 in response to the compressive loading will produce greater convexity of the longer segments 24. As a result, the prior known rings had to have relatively short segments 24. Because of the required short segments, the slots 28 could not be materially offset and the openings 27 had to be relatively narrower. Wide openings are desirable to permit free oil flow through the end portion of the ring for drainage back through the piston and, of course, material offsetting of the slots is desirable to minimize oil leakage in an axial direction through the ring. The segments of the rings of this invention can be as long or short as desired and the only limiting factor is the maintenance of enough cross over webs to insure axial strength. A range of from about 0.1" to about 0.6" is desirable for the segment lengths.

Maintenance of flat ring segments is also accomplished by this invention with a lapping or grinding of the outer faces of the segments after the ring has been contracted to its operating diameter. Thus, as shown in Figure 10, the ring 10a of this invention is seated in a jig 30 having a bore 31 contracting the ring to its operating diameter. The bore 31 is of the same dimension as the cylinder in which the ring is to operate. The side faces of the ring segments 14 are then ground or lapped at 32 by rotating stones or honing tools 33. If the segments 14 are humped or in any way rendered convex due to the contraction of the ring to its operating diameter, the lapping or grinding operation will remove all of the high spots on the segments so that true flat faces 32 are provided.

As shown in Figure 11, the lapped ring 10a when released from the jig 30 of Figure 10, will have the outer faces 32 thereon somewhat concave in the event that humping of these faces occurred when the ring was compressed to its operating diameter. A feature of this invention, therefore, includes a ring having concave segments in its free state.

In the piston and cylinder assembly 35 of Figure 12, a piston 36 is illustrated as being reciprocally mounted in a cylinder wall 37 of an engine block 38. This piston 36 contains piston grooves 39, 40, and 41 with conventional piston rings 42 and 43 seated in the grooves 39 and 40 and with an oil ring 10 of this invention seated in the groove 41. As is customary, the oil groove 41 has oil drainage ports 44 joining the ring groove with the interior of the piston. The segments 14 of the ring 10 as shown, have full seating engagement with the side walls 41a of the ring groove 41. Since these segments are maintained flat when the ring is compressed to a diameter of the cylinder wall 37, clearances of from .001 to .003 inch between the sides 41a of the ring groove and the sides of the ring 10 are maintained all around the piston groove and have resulted in greater oil economy than has heretofore been known with the use of sheet metal piston rings.

Oil economy is further enhanced by coating the rings 10 and 10a of this invention with a soft quick wear-in metal such as tin. As shown in Figure 13, the ring 10 of this invention has a soft metal coating 45 of tin, cadmium, lead, or the like, thereon. This coating extends over the outer peripheral edges of the segments 14 to provide quick wear-in surfaces for these scraping edges. The coating also extends over the faces of the segments 14 which confront the side walls 41a of the ring groove.

From the above descriptions it will be understood that this invention provides sheet metal piston rings which will not hump in operation and which can have longer ring segments and larger drain openings than were heretofore usable.

It will be understood that variations and modifications may be effected without departing from the scope of the novel concepts of this invention.

We claim as our invention:

1. A packing ring for seating in a ring groove having flat sides which comprises a resiliently expansible and contractible ring composed of axially spaced rows of circumferentially aligned segments connected by cross-webs integral with the segments, said segments of one row arranged in staggered relationship with respect to the segments of an adjacent row, and said ring when resiliently contracted to its operating diameter presenting flat planar side faces on the segments to the side walls of the ring groove.

2. A self-expanding flexible piston ring which comprises superimposed rows of circumferentially arranged ring segments, webs integral with the segments connecting the segments in one row with adjacent segments in the other row and holding the segments in each row, said segments of one row arranged in staggered relationship with respect to the segments of an adjacent row, and said ring when contracted to its operating diameter having flat side faces defined by the outer faces of said segments.

3. A resiliently expansible flexible piston ring comprising a channel defining annulus having the sides thereof composed of circumferentially arranged flat segments and having the bight portion thereof composed of circumferentially spaced webs integral with said segments and connecting the segments in one side with adjacent segments in the other side, said segments of one row arranged in staggered relationship with respect to the segments of an adjacent row, said webs being adapted to flex to accommodate resilient contraction of the annulus without humping the outer faces of the segments in each side out of a flat plane.

4. A self-expanding sheet metal piston ring which comprises axially spaced rows of circumferentially arranged ring segments, circumferentially spaced cross-webs integral with said segments joining a segment in one row with adjacent segments in the other row, said segments of one row arranged in staggered relationship with respect to the segments of an adjacent row, and said segments in each row having flat outer faces lying in a single plane when the ring is compressed to operating diameter and each segment having a longitudinal length of from 0.1" to 0.6".

5. A self-expanding piston ring which comprises axially spaced rows of circumferentially spaced ring segments, circumferentially spaced cross-webs integral with said segments joining a segment in one row with adjacent segments in the other row, said segments of one row arranged in staggered relationship with respect to the segments of an adjacent row, said segments having concave outer faces in the free uncompressed condition of the ring and having flat outer faces in the compressed operating diameter condition of the ring.

6. A self-expanding resilient piston ring comprising a sheet metal annulus having axially spaced flat rows of circumferentially spaced segments and webs connecting the segments and holding the rows in axially spaced relation, said webs diverging from the longitudinal central portion of a segment in one row to the longitudinal central portion of adjacent webs in the other row whereby circumferential contraction of the ring will swing the divergent ends of the webs toward each other without bending the segments out of alignment in the flat rows.

7. A self-expanding piston ring comprising an annulus having axially spaced flat rows of circumferentially spaced ring segments, and V-shaped webs around the inner periphery of the ring connecting the segments and holding the rows in axially spaced relation, said inner periphery of the ring having triangular shaped openings between the webs.

8. A self-expanding piston ring comprising two axially spaced rows of circumferentially spaced ring segments, the segments in one row being offset with relation to segments of the other row to stagger the slots between the segments, and cross-webs connecting the inner peripheral portions of the segments at the longitudinal central portions thereof whereby contraction of the ring to narrow the slots between the segments will be accommodated solely by flexing of the webs without bending the segments.

9. A self-expanding piston ring comprising axially spaced rows of circumferentially spaced ring segments, said ring segments having longitudinal lengths over 0.2" and being in staggered relation in said rows to materially misalign the slots therebetween, and webs at the inner peripheral portions of the segments connecting the longitudinal central portion of a segment in one row with the longitudinal central portion of the two adjacent segments in the other row.

10. A self-expanding piston ring comprising a strip of resilient sheet metal folded longitudinally to provide a channel and formed in an annulus shape with the ends of the strip adapted to abut each other, said channel having segmented side legs with slots between the segments, the slot in one side leg being materially offset from the slots in the other side leg, and the bight portion of the channel having triangular shaped openings communicating with said slots.

11. A U-shaped resilient self-expanding sheet metal piston ring having side legs composed of circumferentially spaced ring segments and a bight portion composed of cross-webs connected to a longitudinal central portion of said segments, and a soft metal coating on the outer edges and outer faces of said side legs for providing wear-in surfaces, said outer faces of side legs being flat when the ring is compressed to operating diameter.

12. A self-expanding piston ring comprising axially spaced rows of circumferentially spaced ring segments, said ring segments having longitudinal lengths greater than 0.2 inch and being in staggered relationship in said rows to materially misalign the slots therebetween, and inclined webs at the inner peripheral portions of the segments connected to the central portion of a segment in one row with the central portion of a staggered segment of the other row.

13. A self-expanding piston ring which comprises axially spaced rows of circumferentially arranged ring segments, said segments of one row being staggered with the segments of an adjacent row, circumferentially spaced cross-webs integral with said segments joining a segment in one row with segments in an adjacent row, said webs being adapted to flex to accommodate resilient contraction of the ring, whereby humping of the outer faces of the segments in each row out of a flat plane is substantially eliminated thereby materially reducing oil leakage.

References Cited in the file of this patent

UNITED STATES PATENTS

| Number | Name | Date |
| --- | --- | --- |
| 2,224,338 | Bowers | Dec. 10, 1940 |
| 2,313,395 | Phillips | Mar. 9, 1943 |
| 2,397,636 | Zahodiakin | Apr. 2, 1946 |
| 2,563,667 | Zahodiakin | Aug. 7, 1951 |
| 2,631,073 | Shirk | Mar. 10, 1953 |
| 2,650,143 | Olson | Aug. 25, 1953 |
| 2,671,705 | Engelhardt | Mar. 9, 1954 |